(12) United States Patent
Veldman

(10) Patent No.: US 7,093,965 B2
(45) Date of Patent: Aug. 22, 2006

(54) AUTOMOTIVE LIGHTING ASSEMBLY WITH DECREASED OPERATING TEMPERATURE

(76) Inventor: Roger L Veldman, 135 S. Wall St., Zeeland, MI (US) 49464

( * ) Notice: Subject to any disclaimer, the term of this patent is extended or adjusted under 35 U.S.C. 154(b) by 387 days.

(21) Appl. No.: 10/190,052

(22) Filed: Jul. 3, 2002

(65) Prior Publication Data
US 2003/0007357 A1    Jan. 9, 2003

Related U.S. Application Data

(60) Provisional application No. 60/303,941, filed on Jul. 9, 2001.

(51) Int. Cl.
*F21V 11/00* (2006.01)
(52) U.S. Cl. .................. 362/494; 362/294; 362/151; 362/144; 362/551; 362/293
(58) Field of Classification Search ............. 362/474, 362/494, 543, 544, 545, 230, 231, 135, 140, 362/141, 293, 294, 345, 151, 144, 551; 313/113
See application file for complete search history.

(56) References Cited

U.S. PATENT DOCUMENTS

| | | | |
|---|---|---|---|
| 4,733,336 A | 3/1988 | Skogler et al. ............. | 362/142 |
| 5,177,396 A * | 1/1993 | Gielen et al. ............... | 313/113 |
| 5,339,198 A | 8/1994 | Wheatly et al. ............ | 359/359 |
| 5,353,210 A * | 10/1994 | Strok et al. ................. | 362/293 |
| 5,666,017 A * | 9/1997 | McGuire ..................... | 313/110 |
| 5,669,699 A | 9/1997 | Pastrick et al. ............ | 362/83.1 |
| 5,743,632 A * | 4/1998 | Carl ............................ | 362/294 |
| 5,823,654 A | 10/1998 | Pastrick et al. ............ | 362/83.1 |
| 5,863,116 A | 1/1999 | Pastrick et al. ............ | 362/494 |
| 5,871,275 A | 2/1999 | O'Farrell et al. ........... | 362/494 |

(Continued)

OTHER PUBLICATIONS

Research Article—Giant Birefringent Optics in Multilayer Polymer Mirrors *Science*, vol. 287 Mar. 31, 2000, 6 pages.

(Continued)

*Primary Examiner*—Sandra O'Shea
*Assistant Examiner*—Anabel Ton
(74) *Attorney, Agent, or Firm*—Van Dyke, Gardner, Linn & Burkhart, LLP

(57) ABSTRACT

A lighting assembly for an interior rearview mirror assembly of a vehicle includes an illumination source, a reflective element and a lens. The illumination source is operable to radiate radiation including visible radiation and infrared radiation. The radiation from the illumination source impinges on the reflective element. The reflective element reflects reflected radiation toward the lens. The reflective element is adapted to at least partially transmit the infrared radiation so that reduced reflection of the infrared radiation occurs toward the lens. The lens may include an optical element which functions to substantially transmit the visible radiation through the optical element and the lens while at least partially reflecting the infrared radiation generally away from the lens.

33 Claims, 4 Drawing Sheets

U.S. PATENT DOCUMENTS

| | | | |
|---|---|---|---|
| 5,879,074 A | 3/1999 | Pastrick | 362/494 |
| 5,889,581 A * | 3/1999 | Tokuda | 355/71 |
| 5,977,694 A * | 11/1999 | McGuire | 313/110 |
| 6,053,623 A * | 4/2000 | Jones et al. | 362/310 |
| 6,124,886 A | 9/2000 | DeLine et al. | 348/148 |
| 6,176,602 B1 | 1/2001 | Pastrick et al. | 362/494 |
| 6,227,689 B1 | 5/2001 | Miller | 362/494 |
| 6,276,821 B1 * | 8/2001 | Pastrick et al. | 362/494 |
| 6,331,066 B1 | 12/2001 | Desmond et al. | 362/494 |
| 6,439,755 B1 | 8/2002 | Fant, Jr. et al. | 362/494 |
| 6,601,980 B1 * | 8/2003 | Kobayashi et al. | 362/510 |
| 6,896,396 B1 * | 5/2005 | Yagi | 362/510 |
| 2002/0003571 A1 | 1/2002 | Schofield et al. | 348/148 |
| 2002/0159270 A1 | 10/2002 | Lynam et al. | 362/492 |

OTHER PUBLICATIONS

Thermashield Brochure—Dec. 1992, 1 page.

3M Radiant Light Film, 3M Radiant Mirror Film VM2000 Product Information, 2 pages.

* cited by examiner

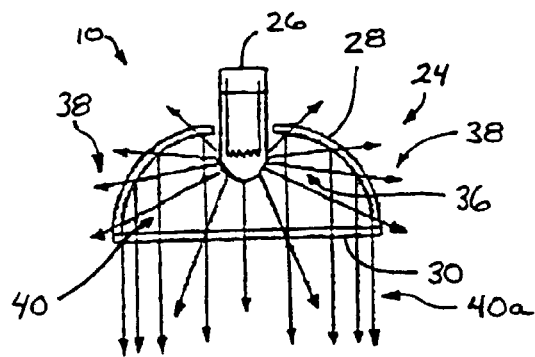
FIG. 8
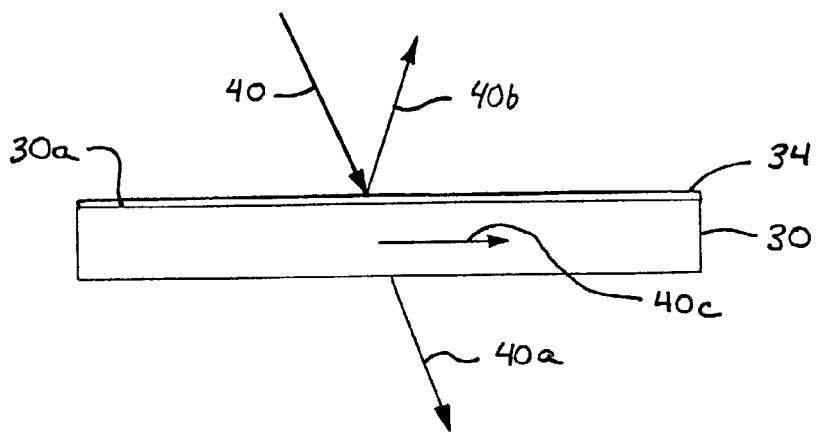
FIG. 9
| Reflector Type Used | Lens Temperature |
|---|---|
| Standard Aluminum | 57.7 degrees Celsius |
| Polymeric Heat Transmitting Film Reflector | 38.9 degrees Celsius |
FIG. 10

AUTOMOTIVE LIGHTING ASSEMBLY WITH DECREASED OPERATING TEMPERATURE

CROSS REFERENCE TO RELATED APPLICATION

The present application claims priority on U.S. provisional application, Ser. No. 60/303,941, filed Jul. 9, 2001 by Roger L. Veldman for AUTOMOTIVE LIGHTING ASSEMBLIES WITH DECREASED OPERATING TEMPERATURE, which is hereby incorporated herein by reference in its entirety.

FIELD OF THE INVENTION

The present invention relates generally to automotive lighting assemblies and, more particularly, to interior automotive lighting assemblies, such as for interior rearview mirror assemblies, which are configured for operating at reduced temperatures.

BACKGROUND OF THE INVENTION

Automotive lighting units and lamp assemblies are commonly used on vehicles today. Lighting units are typically used on the interior of the vehicle for general area illumination or as localized light sources, commonly referred to as map lamps or reading lamps. Automobile headlamps are used to illuminate the roadway for night driving and for enhancing vehicle visibility during daytime driving, especially when rainy or foggy conditions are present. Additionally, brake lamps and signal lamps are used to communicate a driver's intended actions to drivers of other road vehicles as well as pedestrians.

As shown in FIGS. 1–3, a conventional lighting device 1 includes a lamp or bulb 2, a reflector 3 and a lens 4. As shown in FIG. 2, the reflector 3 reflects the light from the lamp 2 so that the light rays 5 are reflected toward the lens 4. The direction of the reflected light may be altered depending on the shape and overall design of the reflector 3 and lens 4.

Primarily, these lighting units and lamp assemblies rely on incandescent (vacuum or gas filled) lamps as illumination sources. These lamps are often used in conjunction with a metallic reflector in order to increase the output of the lighting devices by reflecting a significant portion of the light produced by the lamp filament toward the desired illumination target zone, which is unique for each lighting application. In many cases, increased demands for safety and customer satisfaction have resulted in a need for greater light output for automotive lighting units and lamp assemblies. In response to customer demands for greater light output from these devices, lighting unit designers have typically sought to incorporate more powerful light sources (typically incandescent vacuum or gas filled lamps) and more efficient lighting reflectors and lens designs.

Typically, the reflectors are constructed from a thin stamped aluminum substrate or from a thin reflective coating, such as aluminum deposited onto a substrate such as glass or a polymer, such as acrylic or polycarbonate, which has been pre-formed into the desired reflector shape. When using a traditional metallic reflector, such as aluminum, a significant portion (typically about 90 percent) of light in the visible region, with a wavelength range of approximately 400 to approximately 700 nanometers, can be reflected. Thus, with the appropriate design of the reflector shape, about 90 percent of the visible light emitted by the lamp filament that strikes the reflector can be directed through the lens of the lighting unit toward the target illumination zone. Through advanced engineering techniques, such as computerized ray-tracing algorithms, efficient reflector shapes can be derived which maximize the amount of light that can be directed through the lens, out of the lighting unit, and toward the target zone. In addition to increased efficiencies gained through optimized reflector designs, more powerful lamps are also used to generate more light at the target illumination zone in or around the vehicle.

Although the above-identified efforts to increase light output from automotive lamps and lighting units have been effective in their primary design objective, they have brought about an unwanted effect, namely, increased heating of the lamp or lighting unit lens member. Such an increase in lens temperature causes several unwanted and/or problematic results. First, lighting unit lenses which are used for map and reading lamp functions are exposed to the interior portion of the vehicle, whereby the outer surface of the lighting unit lens may be touched by vehicle occupants. In order to protect against pain or injury caused by touching an excessively hot surface, automobile manufacturers have specified that the lens temperature must remain below a predetermined safe temperature threshold. The maximum allowable lens temperature varies by automobile manufacturer, but is often in the range of approximately 40 to approximately 65 degrees Celsius.

An additional problem that can occur due to the excessive heating of the lens of an automotive lighting unit is deformation, discoloration, and/or burning of the polymeric lens substrate. This can mean that the light output of a lighting unit may indeed be limited by the mechanical properties of the lens material. Thus, for automotive headlamp applications, increasing the light output of the lamp assembly may limit the choice of suitable lens materials to a glass substrate, which may add more weight as well as cost to a vehicle over a light assembly having a polymeric lens. The thermal stability of polymeric lighting unit lens members is also an issue for map and reading lamp assemblies as well as for brake and signal lamps. Designers of such lighting units must ensure through analysis and testing that the lens member will not undergo any visible deformation, discoloration, and/or burning—even after being continuously used for hundreds of hours. For this reason, the light output of the lamp assembly may be limited by the temperature stability limits of the lens member.

One reason that directing an increased amount of light in the visible region of the spectrum through the lens member of a lighting unit leads to increased temperature in the lens can be explained by considering the full spectrum of radiation emitted by the lamp filament. Using traditional metallic reflectors, any attempt to direct greater amounts of visible light (wavelengths of approximately 400 to 700 nanometers) through the lens will inevitably also direct a larger percentage of radiation in the infrared wavelengths (greater than approximately 700 nanometers) through the lens. When this radiation contacts the inner surface of the lens of the lighting unit, a large percentage (shown generally by the lines 6 in FIGS. 2 and 3) of the incident radiation (typically on the order of 90 percent) will be transmitted through the lens. A small amount (shown generally by the line 7 in FIG. 3) of the incident radiation (about 4 to 5 percent) will be reflected off the interior lens surface back into the lighting unit, and another approximately 5 to 10 percent (shown generally by the line 8 in FIG. 3) of the incident radiation (averaged across all wavelengths emitted by the lamp filament) of the radiation will be absorbed by the lens. The absorption of the radiation by the lens member will cause an increase in temperature of the lens itself. Thus, the more visible light which is directed through the lens, the more the lens will be heated by the associated infrared energy which is absorbed by the lens.

This is best understood by considering that the light source of the lamp filament acts as a black body emitter, whose spectral radiation output varies as a function of source temperature. The temperature of the filament source for incandescent (vacuum and gas filled) lamps typically range between approximately 2,400 and approximately 3,000 degrees Kelvin. Considering, for example, the idealized black-body radiation curve for a lamp filament at 3,000 degrees Kelvin (FIG. 4), it can be seen that a small band of emissive power occurs in the visible wavelengths but a much broader band of radiation occurs in the infrared region. Since the reflectivity of traditional metallic reflectors are approximately constant across the visible and infrared regions, it is clear that any attempt to increase visible light output of the lighting unit either by more efficient reflector design geometry or by more powerful light sources, will also increase the amount of infrared radiation that is absorbed by the lens, resulting in increased lens temperature. For this reason, the light output of such a device will likely be limited by the problematic, but as of yet unavoidable, increase in lens temperature.

SUMMARY OF THE INVENTION

The present invention is intended to provide a lighting assembly for use with a vehicle lighting system, such as for an interior rearview mirror assembly or accessory module of a vehicle (which may be mounted to an interior rearview mirror assembly or may be mounted elsewhere within the cabin of a vehicle), or the like. The lighting assembly of the present invention provides for a lower operating temperature at the lens element of the lighting assembly by reducing the amount of infrared radiation that is reflected toward and/or transmitted through the lens element.

According to an aspect of the present invention, an automotive lighting assembly of a vehicle includes an illumination source, a reflective element and a lens. The illumination source is operable to radiate radiation including visible radiation and infrared radiation. The radiation from the illumination source impinges on the reflective element. The reflective element reflects reflected radiation toward the lens. The reflective element is adapted to at least partially transmit the infrared radiation so that reduced reflection of the infrared radiation occurs toward the lens.

Optionally, the lens may include an optical element which functions to substantially transmit the visible radiation through the optical element and the lens while at least partially reflecting the infrared radiation generally toward the reflective element.

According to another aspect of the present invention, an interior rearview mirror assembly for a vehicle includes a mirror casing, a mirror reflector at the casing, at least one lighting assembly at the casing and a mirror mounting assembly for pivotally mounting the casing to the vehicle. The lighting assembly includes an illumination source, a reflective element and a lens. The illumination source is operable to radiate radiation including visible radiation and infrared radiation. The radiation from the illumination source impinges on the reflective element. The reflective element reflects reflected radiation toward the lens. The reflective element is adapted to at least partially transmit the infrared radiation so that reduced reflection of the infrared radiation occurs toward the lens.

Optionally, the lens may include an optical element which functions to substantially transmit the visible radiation through the optical element and the lens while at least partially reflecting the infrared radiation generally toward the reflective element.

According to another aspect of the present invention, a lighting assembly for a vehicle includes an illumination source, a reflective element and a lens. The illumination source is operable to radiate radiation including visible radiation and infrared radiation. The reflective element at least partially surrounds the illumination source, with radiation from the illumination source impinging on the reflective element and reflecting toward the lens. The lens includes an optical element which substantially transmits the visible radiation through the optical element and the lens while at least partially reflecting the infrared radiation generally toward the reflective element so that reduced transmission of the infrared radiation occurs through the lens.

Therefore, the present invention provides a lighting device or assembly which at least partially transmits infrared radiation away from a lens of the lighting device, in order to reduce the amount of infrared radiation that may be absorbed by or transmitted through the lens. The present invention also provides an optical element at the lens which functions to at least partially reflect infrared radiation generally away from the lens and generally toward the reflector, while substantially transmitting radiation in the visible region of the spectrum through the optical element and lens. The present invention thus provides a lighting device which will maintain the lens at a lower temperature during use than conventional lighting devices by transmitting and/or reflecting the infrared radiation away from the lens. Also, because less infrared radiation is absorbed by the lens, there will be less deformation, discoloration and/or burning of the lens over time than with conventional lighting devices. The present invention thus allows for an increased light output from a light source of the lighting device, while maintaining the operating temperature of the lens below the threshold temperature limits of the lens.

These and other objects, advantages, purposes and features of this invention will become apparent upon review of the following specification in conjunction with the drawings.

BRIEF DESCRIPTION OF THE DRAWINGS

FIG. 8 is a sectional view of an automotive interior lighting unit in accordance with the present invention, with light rays shown to indicate the transmissivity of infrared radiation through the reflector;

FIG. 9 is a side elevation of a lens of a lighting device in accordance with the present invention, and depicts the radiation paths at and in the lens; and FIG. 10 is a table showing test results of lens temperatures between a lighting unit having a conventional aluminum reflector and a lighting unit having a heat transmitting reflector in accordance with the present invention.

DESCRIPTION OF THE PREFERRED EMBODIMENTS

Figure 1:
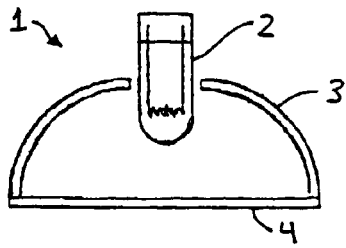
FIG. 1 is a sectional view of a typical automotive interior lighting unit.
Figure 2:
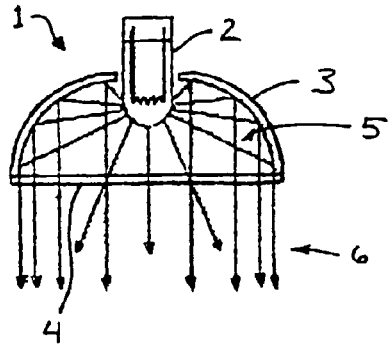
FIG. 2 is the same view as FIG. 1, with light rays shown to indicate the reflectance of the light by the reflector.
Figure 3:
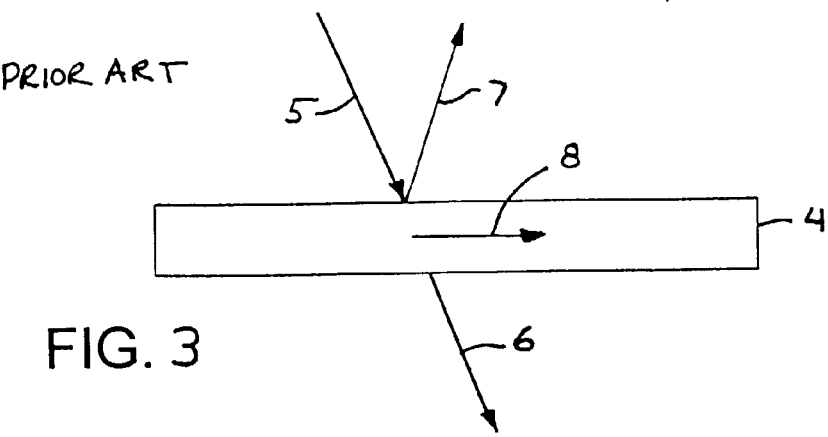
FIG. 3 is a side elevation of a conventional lens for a typical automotive lighting unit, and depicts the radiation paths at and in the lens.
Figure 4:
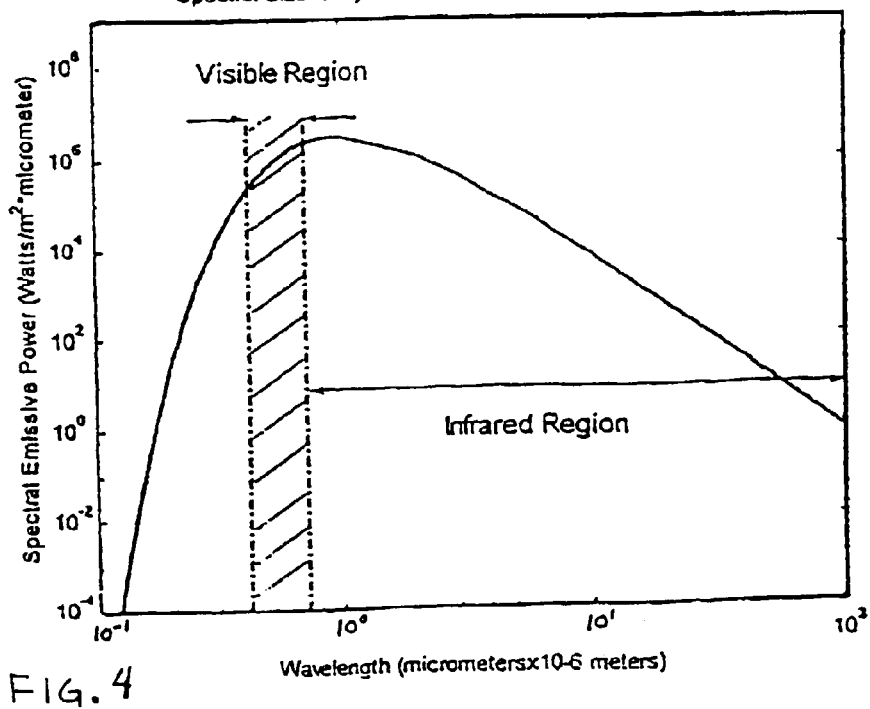
FIG. 4 is a graphical representation of the spectral emissive power of different wavelengths of light.

While this invention is susceptible of embodiments in many different forms, there is shown in the drawings and will herein be described in detail, several specific embodiments with the understanding that the present disclosure is to be considered as an exemplification of the principles of the invention and is not intended to limit the invention to the embodiments illustrated.

Figure 5:
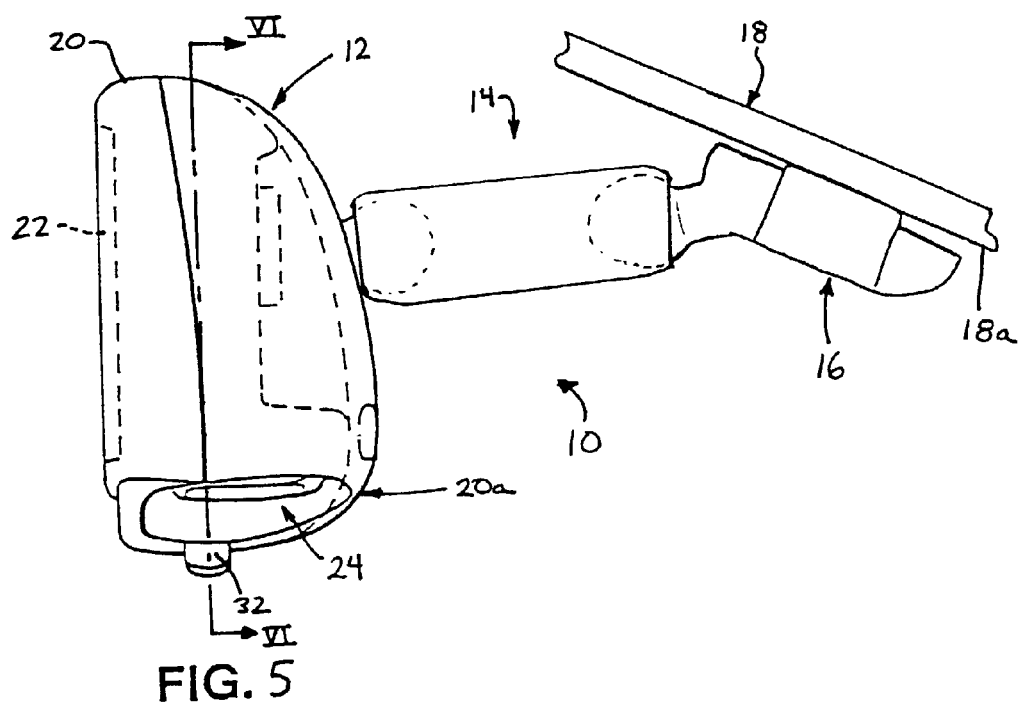
FIG. 5 is a side elevation of an interior rearview mirror assembly with a lighting device in accordance with the present invention.

Referring now to the drawings and the illustrative embodiments depicted therein, an interior rearview mirror assembly 10 includes a mirror body 12, a mounting arm 14 and a mirror mount 16 (FIG. 5). Mirror mount 16 is mountable to any mounting means suitable for mounting the mirror assembly to the vehicle, such as to a conventional mounting button (not shown) on an interior surface 18a of a windshield 18 of the vehicle or the like. In the illustrated embodiment, mirror mount 16, mounting arm 14 and mirror body 12 provide a double ball or double pivot mounting arrangement which allows the mirror body 12 to be pivoted by a driver of the vehicle to suit the driver's rearward field of view, as is known in the art. Clearly, other mounting means, such as a single ball or single pivot mounting arrangement, may be implemented to mount the mirror body to the windshield or to the headliner of a vehicle, without affecting the scope of the present invention.

Figure 7:
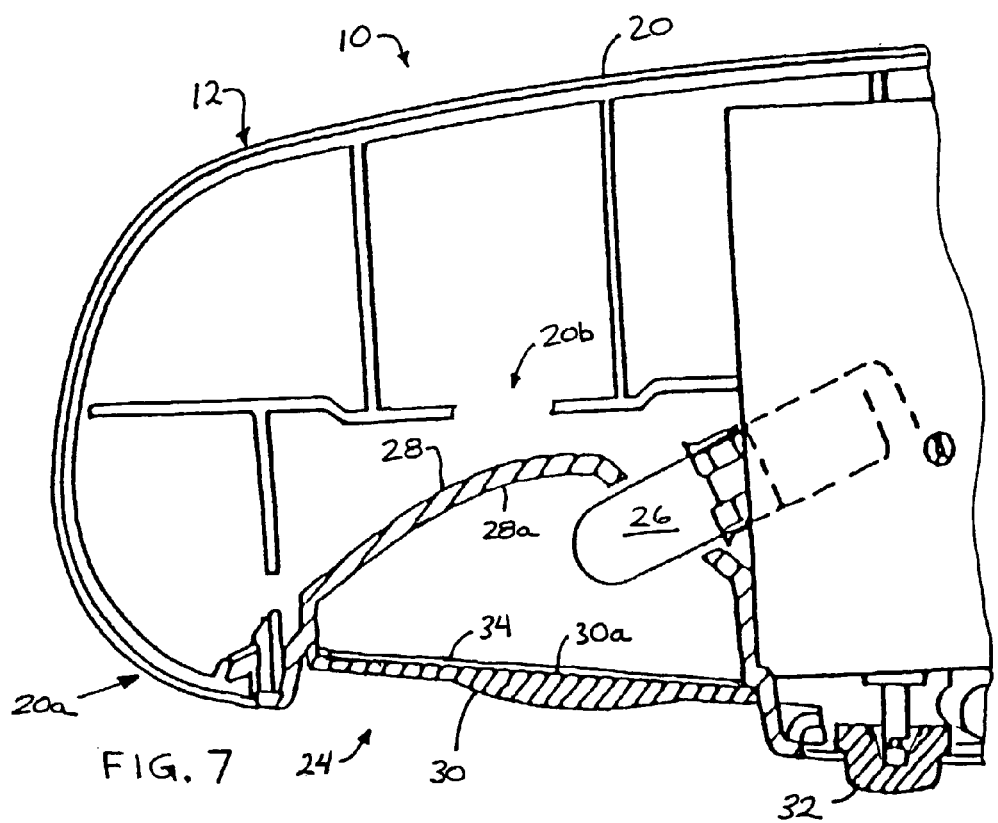
FIG. 7 is an enlarged sectional view of one of the lighting devices of the interior rearview mirror assembly of FIG. 6.
Figure 6:
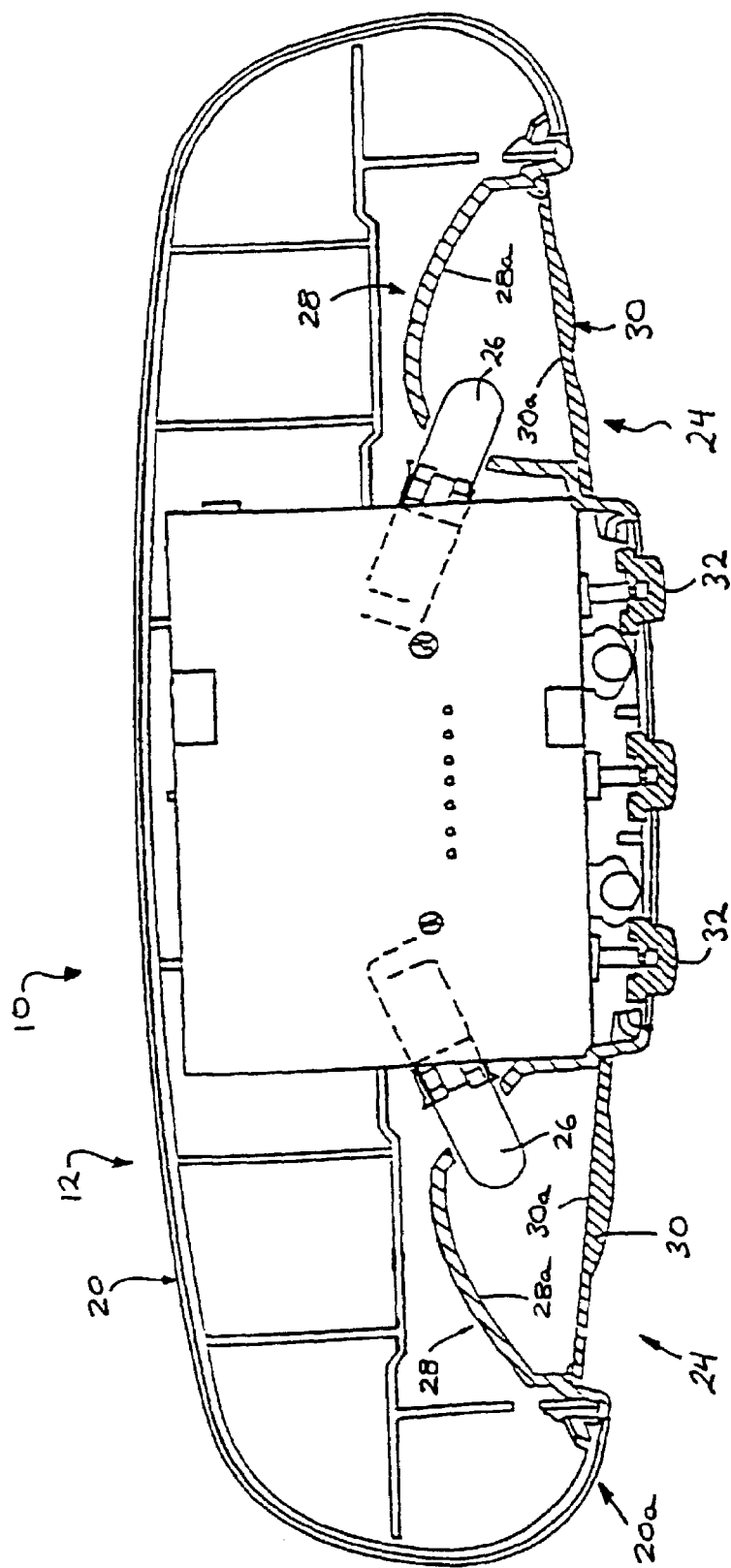
FIG. 6 is a sectional view of the interior rearview mirror assembly taken generally along the line VI—VI in FIG. 5.

Mirror body 12 includes a casing 20 and a reflector or reflective element 22. Reflector 22 may be a prismatic reflector or an electrochromic reflector, as are known in the art, without affecting the scope of the present invention. Interior rearview mirror assembly 10 includes a pair of lamps or lighting devices 24, such as map reading lights or the like positioned at a lower portion 20a of mirror casing 20. As shown in FIGS. 6 and 7, each of the lighting devices 24 includes an illumination source 26, such as an incandescent bulb, a light emitting diode, or any other type of illumination source, a reflector or reflective member or element 28 and a lens or lens member or element 30. The illumination source 26 may be actuated or energized in response to one or more user actuatable buttons 32 or the like at interior rearview mirror assembly 10. The reflector 28 and lens 30 function to direct the illumination generated by illumination source 26 downward or otherwise in a desired direction, depending on the application and desired result of the lighting device 24 (for example, the illumination may be directed generally toward a lap area of a driver or passenger of the vehicle to provide illumination for the driver or passenger to be able to read a map or the like).

The present invention is primarily useful with light sources, such as incandescent light sources, that have a significant visible light output, typically in a range of approximately 300 to 750 nanometers, but that also have a considerable amount of infrared radiation output in the non-visible range, typically approximately 800 nanometers and higher.

In order to increase the amount of visible light produced by an automobile lighting unit, while minimizing the heating of the optical lens of the unit, the present invention incorporates a reflector or reflective member or element 28 that reflects a significant portion of light in the visible region while transmitting a significant portion of radiation in the infrared region. Reflector 28 may be constructed of glass or plastic and may be either coated with or constructed from specially selected materials which provide high reflectivity of visible light or radiation, but high transmission of infrared energy or radiation. The use of such reflectors, sometimes referred to as cold reflectors, may allow a substantial portion of the visible light generated inside the lighting unit to be reflected through the lens and toward the target illumination zone in or around the vehicle, while allowing a substantial portion of the infrared radiation emitted by the lamp filament to be transmitted through the reflector and out of the upper or back portion of the lamp assembly or lighting unit. In this way, a significant quantity of heat can be safely transferred out of the lighting unit and into the ambient environment, such as, for example, through a venting area or portion 20b of the mirror casing 20 of mirror assembly 10 (FIG. 7).

Clearly, the lighting assembly or device of the present invention is equally applicable or suitable for other applications, such as dome lamps, door lamps, compartment lamps, and any other interior or exterior lights or lamps of a vehicle. In the case of a map, reading, or dome lamp application, this radiation could be transferred out of the upper portion of the lighting unit and into the vehicle roof structure and adjacent sheet metal, which would act as a very effective heat sink to dissipate the heat to the ambient environment. For other lighting assemblies in accordance with the present invention, the thermal radiation that is transmitted through the reflector may be transmitted to the surrounding vehicle structure and/or can be dissipated by convection to the surrounding air space.

By utilizing a substantially heat transmitting reflector, the light output of an automotive lighting unit can be increased while still ensuring that the lens temperature remains safely below the predetermined burn threshold temperature and that the lens member does not undergo deflection, discoloration, and/or burning due to excessive temperature exposure.

Reflector 28 preferably consists of a substrate partially transmissive to, and preferably substantially transmissive to, radiation of spectral content of greater than approximately 800 nanometers. The inner surface 28a of the reflector 28 may be adapted to be partially reflective, and preferably substantially reflective, preferably approximately 45 percent reflective, more preferably approximately 55 percent reflective, and most preferably approximately 65 percent reflective, of visible radiation within a range of approximately 300 to 700 nanometers.

In accordance with the present invention, a cold reflector fabricated from a coated glass substrate could be used, such as the type commercially available from Balzers Thin Films of Liechtenstein. Such mirrors, sold under the Cold Light Reflector™ brand name, specify an average reflectance in the visible region (approximately 400 to 700 nanometers) of greater than approximately 95 percent and an average transmission in the infrared region (approximately 700 to 2000 nanometers) of greater than approximately 85 percent.

For reasons of cost and/or durability, a polymeric heat transmitting reflector design may be used. Such a reflector is described in U.S. Pat. No. 5,339,198, the entirety of which is hereby incorporated herein by reference. Another example of a polymeric heat transmitting reflector that would be effective in this invention is a multi-layer polymeric reflective film known as radiant light film (product number VM2000) sold by the 3M Corporation of St. Paul, Minn.

Although this specified film is quite thin (61 to 68 microns thick), it is contemplated that this material could be co-extruded with or otherwise affixed to a thicker polymeric substrate to allow subsequent forming of the material into/onto a reflector of the desired shape for optical efficiency. Co-extruding the optical layer with a thicker substrate (typically on the order of 1 to 3 millimeters) allows the sheet material to be formed into the desired geometry, such as a parabolic shape, with a single thermal forming process (such as vacuum forming). With this process, the reflector can be fully functional after the forming process and may not need costly additional processes such as vacuum deposition of aluminum or other coating layers. It is further contemplated that the heat transmissive layer should be co-extruded or otherwise affixed to a generally transparent substrate to allow the infrared radiation to transmit through both the reflective layer or layers and the supporting reflector substrate.

Because the polymeric layers that comprise the reflective sheet substrate may undergo a decrease in thickness as the substrate is stretched or drawn into the desired shape during the thermoforming process, it is envisioned that it may be advantageous to utilize slightly larger layer thicknesses in the initial reflector substrate to compensate for this reduction in thickness. In this way, the optical properties of the final formed reflector may be better suited to meet the demands of the particular application.

Optionally, alternately or additionally, in accordance with a second aspect of the present invention, the lens temperature of an automotive lighting unit or lamp assembly may be otherwise or further reduced through the use of a lens element in conjunction with an optical element which transmits radiation in the visible region (approximately 400 to 700 nanometers) while reflecting radiation in the infrared region (approximately 700 to 2000 nanometers). In this manner, only the visible portion of the radiation generated in the lighting unit, representing only a small fraction of the total radiation emitted by the lamp filament, is transmitted through the lens member or element. By reflecting the infrared portion of the radiation away from the lens and back into the lighting assembly, the lens temperature can be reduced.

As best seen in FIGS. 7 and 9, lens 30 may include an optical element 34 which transmits radiation in the visible region while reflecting radiation in the infrared region. Such an optical element is sometimes referred to as a hot mirror, and may be constructed of glass or plastic and may be either a separate member placed or affixed in front of the lens element 30 or may be integrally constructed with the lens element 30. For example, as shown in FIGS. 7 and 9, the interior surface 30a of the lens element 30 of automotive lighting unit 24 could be coated with or affixed with such an optical element 34. If a polymeric lens element is used, the optical element could be co-extruded, thermally bonded, adhesively bonded and/or otherwise attached to the lens. Alternately, the optical element could be provided on the lens through a chemical coating or series of coatings that could be applied by dip coating, spray coating, vacuum deposition, sputter coating, and/or other suitable methods, without affecting the scope of the present invention.

For this invention, one suitable infrared-reflecting optical element is a coated borosilicate glass hot mirror, part number 775FW82-25, sold by the Andover Corporation of Salem, N.H. For applications where a non-planar lens element is required, deposition of a coating or coatings directly onto a preformed lens element, either glass or polymeric, may be advantageous.

For reasons of cost and durability, it may be beneficial for this invention to utilize a polymeric heat reflecting optical element. One such reflecting element is available under the trade name of 3M™ Multilayer Optical Films, from the 3M Corporation of St. Paul, Minn. Although such polymeric films are often quite thin, it is contemplated that such films could be co-extruded with or otherwise affixed to a thicker polymeric substrate to allow subsequent forming of the material into a reflector of the desired shape for optical efficiency. Co-extruding the optical layer with a thicker substrate (typically on the order of 1 to 3 millimeters) allows the sheet material to be formed into the desired geometry, such as a parabolic shape, with a single thermal forming process (such as vacuum forming). With this process, the lens would be fully functional after the forming process and would not need costly additional processes, such as vacuum deposition of aluminum or other coating layers.

The optical element of the present invention is functional to substantially transmit the visible radiation from the illumination source through the optical element and the lens while at least partially reflecting the infrared radiation from the illumination source away from the lens and generally toward the reflective element so that reduced transmission of the infrared radiation occurs through the lens. Preferably, the optical element reflects at least approximately 30 percent of the infrared radiation away from the lens and back generally toward the reflective element, while preferably transmitting at least approximately 50 percent, and more preferably at least approximately 70 percent, of the visible radiation from the illumination source and/or the reflector through the optical element and the lens. More preferably, the optical element reflects at least approximately 50 percent of the infrared radiation away from the lens and back generally toward the reflective element and, most preferably, reflects at least approximately 70 percent of the infrared radiation away from the lens and back generally toward the reflective element.

Although each of the aspects of this invention can be practiced separately, it may be beneficial to combine both aspects of the present invention into a single lighting assembly. In this manner, an automotive lighting unit or lamp assembly 24 could be constructed with a reflective element 28 that is designed to transmit a substantial portion of radiation in the infrared region, while reflecting a substantial portion of radiation in the visible region, in order to reduce reflection of infrared radiation toward the lens. Additionally, the lighting unit may include a lens element 30 which may include an optical element 34, which transmits a substantial portion of radiation in the visible region through the optical element and lens, while reflecting a substantial portion of radiation in the infrared region away from the lens. However, an automotive lighting assembly of the present invention may have a conventional lens with a reflective element which transmits a portion of radiation in the infrared region, or may have a conventional reflector with a lens and optical element which transmit a substantial portion of visible radiation while reflecting a substantial portion of infrared radiation, without affecting the scope of the present invention. The benefits of either or both aspects of the present invention is reduced heating of the lens element, since a reduced amount of infrared radiation is reflected toward and/or transmitted through the lens element.

As shown in FIGS. 8 and 9, visible light rays 36 from the illumination source 26 are emitted toward the lens element 30 or are reflected and directed by reflector 28 toward lens element 30, while a portion 38 of the infrared radiation passes through the reflector and radiates to an area remote from the lens or other areas where a user may touch. The remaining light or radiation 40, including reflected visible radiation and any infrared radiation which may not have transmitted through the reflector, and including light or radiation directly from the light source (non-reflected light), may be directed generally toward the lens element. As shown in FIG. 9, a substantial portion 40a of the light rays 40 from the illumination source 26 and/or the reflector 28 partially pass through the optical element 34 and the lens element 30, while a portion 40b of the infrared radiation reflects off of optical element 34 away from lens element 30 and back generally toward reflector 28, where the radiation may substantially pass or transmit through reflector 28. As also shown in FIG. 9, a small portion of radiation 40c may still be absorbed by lens 30, but this may be a significantly less amount than the amount of radiation absorbed by a lens of a conventional lighting unit.

Experimental Results

In a simple experimental demonstration of the merits of this invention, a half cylindrical shaped reflector was formed using both conventional aluminum film and a polymeric cold reflective film. In this trial, a typical automotive dome or map lamp bulb (Sylvania #561-12 Volts, 1 Amp) was used. A slightly diffused polycarbonate lens with a thickness of approximately 2.4 millimeters was placed in front of the prototype lamp unit. The target illumination plane was placed at a distance of approximately 0.45 meters away from the lower surface of the lighting unit. The temperature of the outer lens surface was measured using a thermocouple wire pressed into contact with the lens.

After allowing the lighting unit to operate for approximately 15 minutes, it was determined that a steady-state temperature had been reached. The lens temperatures using both the standard aluminum reflector and the multi-layer polymeric reflective film (known as radiant light film (product number VM2000) sold by the 3M Corporation) were measured (see results in the Table of FIG. 10).

As indicated in the results shown in FIG. 10, the use of polymeric reflector can significantly reduce the lens temperature of the lighting unit when compared to a conventional aluminum reflector. Additionally, this lens temperature reduction is attainable with effectively no loss of visible light in the target illumination zone in the vehicle.

Although shown and described as being a lighting device for an interior rearview mirror assembly of a vehicle, the present invention may be equally applicable to other types of lighting devices of a vehicle, such as dome lights, map lights or other cabin illumination lights or the like in a console or at the headliner or ceiling of a vehicle, map lights or the like in an accessory module within the vehicle (which may contain one or more other accessories associated with the vehicle, and which may be mounted at the interior rearview mirror assembly or at a headliner of the vehicle or elsewhere within the vehicle cabin), lighting devices at an instrument panel of the vehicle, door lighting devices, such as at an interior panel of a door of the vehicle, glove compartment or storage compartment lights, trunk compartment lights, exterior lighting devices, such as headlamps, taillights, brake lights, turn signal lights, security lighting devices or the like, or any other interior or exterior lighting devices of a vehicle, without affecting the scope of the present invention.

Therefore, the present invention provides a lighting device for a vehicle which reduces the amount of infrared radiation absorbed by a lens of the lighting device, thereby reducing the temperature of the lens during operation of the lighting device. A portion of the infrared radiation emitted from the illumination source may be transmitted through the reflector of the present invention and/or a portion of the infrared radiation emitted from the illumination source may be reflected away from the lens, in order to reduce the amount of infrared radiation being absorbed by the lens. The present invention thus limits or reduces any deformation, discoloration and/or burning of the lens and may allow for increased light output while maintaining the lens at or below its temperature limits.

The foregoing description merely explains and illustrates the invention and the invention is not limited thereto except insofar as the appended claims are so limited, as those skilled in the art who have the disclosure before them will be able to make modifications without departing from the scope of the present invention.

The embodiments of the invention in which an exclusive property or privilege is claimed are defined as follows:

1. A lighting assembly for a vehicle, said lighting assembly comprising:
    an illumination source which is operable to radiate radiation including visible radiation and infrared radiation;
    a reflective element at least partially surrounding said illumination source, said radiation from said illumination source impinging on said reflective element; and
    a lens, said reflective element reflecting reflected radiation toward said lens, said reflective element being adapted to at least partially transmit said infrared radiation through said reflective element so that reduced reflection of said infrared radiation occurs toward said lens in order to provide a reduced operating temperature at said lens, wherein said reflective element comprises a substrate which at least partially transmits infrared radiation of spectral content of greater than approximately 800 nanometers, wherein said reflective element is adapted to reflect at least approximately 45 percent of said visible radiation within a range of approximately 300 to 750 nanometers toward said lens.

2. The lighting assembly of claim 1, wherein said reflective element is adapted to reflect at least approximately 55 percent of said visible radiation within a range of approximately 300 to 750 nanometers toward said lens.

3. The lighting assembly of claim 1, wherein said reflective element is adapted to reflect at least approximately 65 percent of said visible radiation within a range of approximately 300 to 750 nanometers toward said lens.

4. The lighting assembly of claim 1, wherein said illumination source comprises at least one of an incandescent bulb and a light emitting diode.

5. The lighting assembly of claim 1, wherein said illumination source comprises an incandescent bulb.

6. A lighting assembly for a vehicle, said lighting assembly comprising:
    an illumination source which is operable to radiate radiation including visible radiation and infrared radiation;
    a reflective element at least partially surrounding said illumination source, said radiation from said illumination source impinging on said reflective element; and
    a lens, said reflective element reflecting reflected radiation toward said lens, said reflective element being adapted to at least partially transmit said infrared radiation so that reduced reflection of said infrared radiation occurs toward said lens in order to provide a reduced operating temperature at said lens, wherein said lens includes an optical element which at least partially reflects said infrared radiation generally away from said lens.

7. The lighting assembly of claim 6, wherein said optical element substantially transmits said visible radiation through said optical element and said lens while at least partially reflecting said infrared radiation generally away from said lens.

8. A lighting assembly for a vehicle, said lighting assembly comprising:
   an illumination source which is operable to radiate radiation including visible radiation and infrared radiation;
   a reflective element at least partially surrounding said illumination source, said radiation from said illumination source impinging on said reflective element; and
   a lens, said reflective element reflecting reflected radiation toward said lens, said reflective element being adapted to at least partially transmit said infrared radiation so that reduced reflection of said infrared radiation occurs toward said lens in order to provide a reduced operating temperature at said lens, wherein said lens includes an optical element which at least partially reflects said infrared radiation generally away from said lens, wherein said optical element comprises a coating on a surface of said lens facing said illumination source and said reflective element.

9. An interior rearview mirror assembly for a vehicle comprising:
   a mirror casing;
   a mirror reflector at said casing;
   at least one lighting assembly at said casing, said at least one lighting assembly comprising an illumination source, a reflective element at least partially surrounding said illumination source, and a lens, said illumination source being operable to radiate radiation including visible radiation and infrared radiation, said radiation from said illumination source impinging on said reflective element, said reflective element reflecting reflected radiation toward said lens, said reflective element being adapted to at least partially transmit said infrared radiation so that reduced reflection of said infrared radiation occurs toward said lens; and
   a mirror mounting assembly for pivotally mounting said mirror casing to a vehicle.

10. The interior rearview mirror assembly of claim 9, wherein said reflective element comprises a substrate which at least partially transmits infrared radiation of spectral content of greater than approximately 800 nanometers.

11. The interior rearview mirror assembly of claim 10, wherein said reflective element is adapted to reflect at least approximately 45 percent of said visible radiation within a range of approximately 300 to 750 nanometers.

12. The interior rearview mirror assembly of claim 10, wherein said reflective element is adapted to reflect at least approximately 55 percent of said visible radiation within a range of approximately 300 to 750 nanometers.

13. The interior rearview minor assembly of claim 10, wherein said reflective element is adapted to reflect at least approximately 65 percent of said visible radiation within a range of approximately 300 to 750 nanometers.

14. The interior rearview mirror assembly of claim 9, wherein said illumination source comprises at least one of an incandescent bulb and a light emitting diode.

15. The interior rearview mirror assembly of claim 9, wherein said illumination source comprises an incandescent bulb.

16. The interior rearview mirror assembly of claim 9, wherein said lens includes an optical element which at least partially reflects said infrared radiation generally away from said lens.

17. The interior rearview mirror assembly of claim 16, wherein said optical element substantially transmits said visible radiation through said optical element and said lens while at least partially reflecting said infrared radiation generally away from said lens.

18. An interior rearview mirror assembly for a vehicle comprising:
   a mirror casing;
   a mirror reflector at said casing;
   at least one lighting assembly at said casing, said at least one lighting assembly comprising an illumination source, a reflective element at least partially surrounding said illumination source, and a lens, said illumination source being operable to radiate radiation including visible radiation and infrared radiation, said radiation from said illumination source impinging on said reflective element, said reflective element reflecting reflected radiation toward said lens, said reflective element being adapted to at least partially transmit said infrared radiation so that reduced reflection of said infrared radiation occurs toward said lens; and
   a mirror mounting assembly for pivotally mounting said mirror casing to a vehicle, said lens including an optical element which at least partially reflects said infrared radiation generally away from said lens, wherein said optical element comprises a coating on a surface of said lens facing said illumination source and said reflective element.

19. The interior rearview minor assembly of claim 9, wherein said reflective element is adapted to at least partially transmit said infrared radiation to an area remote from said lighting assembly.

20. An interior rearview mirror assembly for a vehicle comprising:
   a mirror casing;
   a mirror reflector at said casing;
   at least one lighting assembly at said casing, said at least one lighting assembly comprising an illumination source, a reflective element at least partially surrounding said illumination source, and a lens, said illumination source being operable to radiate radiation including visible radiation and infrared radiation, said radiation from said illumination source impinging on said reflective element, said reflective element reflecting reflected radiation toward said lens, said reflective element being adapted to at least partially transmit said infrared radiation so that reduced reflection of said infrared radiation occurs toward said lens; and
   a minor mounting assembly for pivotally mounting said miter casing to a vehicle, said reflective element being adapted to at least partially transmit said infrared radiation to an area remote from said lighting assembly, wherein said casing includes a vent area for venting heat from said at least partially transmitted infrared radiation.

21. An interior rearview mirror assembly for a vehicle comprising:
   a mirror casing;
   a mirror reflector at said casing;
   at least one lighting assembly at said casing, said at least one lighting assembly comprising an illumination source, a reflective element at least partially surrounding said illumination source, and a lens, said illumination source being operable to radiate radiation including visible radiation and infrared radiation, said radiation from said illumination source impinging on said reflective element, said reflective element reflecting reflected radiation toward said lens, said reflective element being adapted to at least partially transmit said infrared radiation so that reduced reflection of said infrared radiation occurs toward said lens; and a mirror mounting assembly for pivotally mounting said minor casing to a vehicle, wherein said mirror reflector comprises an electrochromic minor reflector.

22. Art interior rearview minor assembly for a vehicle comprising:

a mirror casing;

a mirror reflector at said casing;

at least one lighting assembly at said casing, said at least one lighting assembly comprising an illumination source, a reflective element at least partially surrounding said illumination source, and a lens, said illumination source being operable to radiate radiation including visible radiation and infrared radiation, said radiation from said illumination source impinging on said reflective element, said reflective element reflecting reflected radiation toward said lens, said reflective element being adapted to at least partially transmit said infrared radiation so that reduced reflection of said infrared radiation occurs toward said lens; and a mirror mounting assembly for pivotally mounting said mirror casing to a vehicle, wherein said mirror reflector comprises a prismatic mirror reflector.

23. An interior rearview mirror assembly for a vehicle comprising:

a mirror casing;

a mirror reflector at said casing;

at least one lighting assembly at said casing, said at least one lighting assembly comprising an illumination source, a reflective element at least partially surrounding said illumination source, and a lens, said illumination source being operable to radiate radiation including visible radiation and infrared radiation, said radiation from said illumination source impinging on said reflective element, said reflective element reflecting reflected radiation toward said lens, said reflective element being adapted to at least partially transmit said infrared radiation so that reduced reflection of said infrared radiation occurs toward said lens;

a mirror mourning assembly for pivotally mounting said mirror casing to a vehicle; and at least one user actuatable button at said casing for actuating said illumination source.

24. The lighting assembly of claim 23, wherein said optical element comprises a coating on a surface of said lens facing said illumination source and said reflective element.

25. A lighting assembly for a vehicle, said lighting assembly comprising:

an illumination source which is operable to radiate radiation including visible radiation and infrared radiation;

a reflective element at least partially surrounding said illumination source, said radiation from said illumination source impinging on said reflective element; and a lens, said reflective element reflecting reflected radiation toward said lens, said lens including an optical element which substantially transmits said visible radiation through said optical element and said lens while at least partially reflecting said infrared radiation generally away from said lens so that reduced transmission of said infrared radiation occurs through said lens in order to provide a reduced operating temperature at said lens, wherein said optical element reflects at least approximately 30 percent of said infrared radiation generally away from said lens.

26. The lighting assembly of claim 25, wherein said optical element transmits at least approximately 50 percent of said visible radiation from said illumination source through said optical element and said lens.

27. The lighting assembly of claim 25, wherein said optical element reflects at least approximately 50 percent or said infrared radiation generally away from said lens.

28. The lighting assembly of claim 25, wherein said optical element reflects at least approximately 70 percent of said infrared radiation generally away from said lens.

29. A lighting assembly for a vehicle, said lighting assembly comprising:

an illumination source which is operable to radiate radiation including visible radiation and infrared radiation;

a reflective element at least partially surrounding said illumination source, said radiation from said illumination source impinging on said reflective element; and a lens, said reflective element reflecting reflected radiation toward said lens, said lens including an optical element which substantially transmits said visible radiation through said optical element and said lens while at least partially reflecting said infrared radiation generally away from said lens so that reduced transmission of said infrared radiation occurs through said lens in order to provide a reduced operating temperature at said lens, wherein said reflective element is adapted to at least partially transmit said infrared radiation so that reduced reflection of said infrared radiation occurs toward said lens.

30. The lighting assembly of claim 29, wherein said reflective element comprises a substrate which at least partially transmits infrared radiation of spectral content of greater than approximately 800 nanometers.

31. A lighting assembly for a vehicle, said lighting assembly comprising:

an illumination source which is operable to radiate radiation including visible radiation and infrared radiation;

a reflective clement at least partially surrounding said illumination source, said radiation from said illumination source impinging on said reflective element; and a lens, said reflective element reflecting reflected radiation toward said lens, said lens including an optical element which substantially transmits said visible radiation through said optical element and said lens while at least partially reflecting said infrared radiation generally away from said lens so that reduced transmission of said infrared radiation occurs through said lens in order to provide a reduced operating temperature at said lens, wherein said illumination source comprises at least one of an incandescent bulb and a light emitting diode.

32. The lighting assembly of claim 31, wherein said illumination source comprises an incandescent bulb.

33. The lighting assembly of claim 31, wherein said lighting assembly is adapted for an interior rearview mirror assembly of a vehicle.

* * * * *

UNITED STATES PATENT AND TRADEMARK OFFICE
CERTIFICATE OF CORRECTION

PATENT NO. : 7,093,965 B2 Page 1 of 1
APPLICATION NO. : 10/190052
DATED : August 22, 2006
INVENTOR(S) : Roger L. Veldman It is certified that error appears in the above-identified patent and that said Letters Patent is hereby corrected as shown below:

Column 11
Claim 8, Line 13, "clement" should be --element--
Claim 13, Line 54, "minor" should be --mirror--

Column 12
Claim 19, Line 29, "minor" should be --mirror--
Claim 20, Line 49, "minor" should be --mirror--
Claim 20, Line 50, "miter" should be --mirror--
Claim 21, Line 67, "clement" should be --element--

Column 13
Claim 21, Lines 6 and 7, "minor" should be --mirror--
Claim 22, Line 8, "Art" should be --An--
Claim 22, Line 8, "minor" should be --mirror--
Claim 23, Line 43, "mourning" should be --mounting--
Claim 24, Line 47, "claim 23" should be --claim 25--

Column 14
Claim 27, Line 11, "or" should be --of--
Claim 31, Line 43, "clement" should be --element--

Signed and Sealed this

Twenty-seventh Day of January, 2009

JOHN DOLL
*Acting Director of the United States Patent and Trademark Office*